2,876,159
DITHIOCARBAMATES FOR TREATMENT OF NICKEL POISONING

Frederick William Sunderman and Bob West, Philadelphia, Pa.

No Drawing. Application April 12, 1957
Serial No. 652,347

9 Claims. (Cl. 167—65)

This invention concerns compositions and methods for mitigating the poisonous effects of nickel in mammals. These compositions and methods are based upon selected salts of dithiocarbamic acids defined below.

The poisonous effects of nickel compounds in warm blooded animals have been recognized for some time. They may, for instance, be absorbed from frequent contacts with soluble salts, as in the electroplating industry, where cases of dermatitis caused by nickel salts have been reported. Nickel poisoning has also been observed in instances where volatile compounds have accidentally been released in the presence of warm blooded animals. Ingestion of soluble nickel salts has also been reported to cause serious effects.

An agent found somewhat effective for alleviating the serious effects of nickel poisoning is BAL, 2,3-dimercapto-1-propanol, which, however, causes some unpleasant side effects.

There is thus still a need for an agent which will serve to counteract the poisonous effects of soluble nickel compounds when they have been taken up by warm blooded animals, particularly when volatile nickel carbonyl has been inhaled, even at low concentrations. The $LD_{50}$ values for nickel carbonyl vary somewhat with different animals, being 0.067, 0.24, and 1.9 mg. per liter of air for mice, rats, and cats respectively for 30-minute exposures. A limit of about 30 p. p. m. in air for humans has been proposed, also for 30-minute exposure. To avoid chronic poisoning from nickel carbonyl in air breathed by humans it has been recommended by the 1956 American Conference of Governmental Industrial Hygienists that the concentration of nickel carbonyl not exceed 0.001 p. p. m. for exposure during working hours. Such figures illustrate the hazards involved and the need for an agent which can be administered to alleviate or mitigate the effects of poisonous nickel compounds in warm blooded animals.

We have discovered that soluble salts of various specific dithiocarbamic acids exert a remarkable detoxifying effect against active nickel compounds which have been absorbed, ingested, inhaled, or otherwise taken up by warm blooded animals. Our method for alleviating or overcoming the poisonous action of active nickel compounds in warm blooded animals comprises administering thereto after exposure to a said nickel compound a water-soluble metal salt of a dialkayldithiocarbamic acid with not more than three carbon atoms per alkyl group or of a heterocyclic dithiocarbamic acid, such as diethoxydithiocarbamic acid. These salts may be given by mouth or by parenteral injection. The amount and extent of administration of a said salt may be regulated by the severity of exposure and the length of time during which elevated levels of nickel continue to be eliminated from the body.

Soluble salts which we have found useful for alleviating the poisonous effects of active nickel compounds are the alkali metal salts, the magnesium salts, and the calcium salts of dialkyldithiocarbamic acids in which the alkyl groups contain not over three carbon atoms each, or of diethoxydithiocarbamic acid and its related acids having the nitrogen in a heterocycle.

These salts can be prepared in crystalline form in a pure state by known methods. These salts tend to give somewhat alkaline solutions, the pH of aqueous 10% solutions, for example, being between 10.5 and about 11.5.

The salts may be used in composition to be administered per os, particularly in the form of pills or tablets. Enteric coated pills may be used or tablets may be prepared with addition of starch and/or milk sugar. Our compositions thus comprise a soluble dithiocarbamate which may be represented by the formula

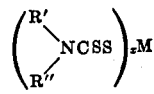

where R' and R" represent, when taken individually, alkyl groups of not over three carbon atoms each or, when taken together, a saturated divalent aliphatic chain which with the nitrogen forms a five- or six-sided heterocycle as in morpholine, pyrrolidine, or piperidine, M represents an alkali metal, magnesium, or calcium, and x represents the valence of the metal. Our preferred compositions are prepared by mixing such a salt and a therapeutically acceptable adjuvant therefor, that is any carrier, liquid or solid, which aids in the introduction of the salt into the body and which is therapeutically acceptable.

Our compositions include those for parenteral injection. These are prepared by dissolving a defined salt in an aqueous sterile parenteral diluent. The salt should be essentially free of microorganims, including spores. They may be rendered so by heating the salt on several successive days to temperatures of 70° to 80° C. or by heating the salt between 70° and 100° C. until water of crystallization is driven off, as shown by the crystals yielding a loose powder, and then heating the dehydrated salt in the range of 140° to 170° C. for about a half hour.

While it is possible to make a solution of sterilized salt in sterilized water and use this solution, this is not recommended as the best course and would be one taken, perhaps, only in an emergency. It appears better to prepare solutions for injection freshly and to include in them a buffer for bringing the pH of the resulting solution into a pH range between 7.5 and 10.

A convenient way of preparing a solution for injection comprises taking a gram of sterile dithiocarbamate in an ampoule with capulette, a 15 ml. size being suitable for an average individual dose for an average man, taking up in a sterile syringe about 10.5 ml. of a sterile solution of about 0.005 gram of sodium dihydrogen phosphate per ml. in water, as a typical buffer solution, transferring this solution to the ampoule containing the dithiocarbamate, and dissolving it in the added solution. The resulting solution may now be withdrawn with a sterile syringe to provide about 10 ml. of clear solution. This may be injected intramuscularly or intravenously. If the latter, injection is accomplished slowly, as over a period of two to five minutes.

The volume of solution prepared and used may, of course, be varied according to such factors as size of the animal and severity of exposure. In general the quantity of salt per dose will be from about 5 mg. to about 100 mg. per kilogram of body weight and will preferably be 10 to 25 mg. per kg. for humans. The choice and concentration of buffering agent may be considerably varied. If administration is by injection, it is best to use an approximately isotonic solution and to use a sodium salt. Administration may be repeated at intervals, particularly if nickel continues to be eliminated. Intervals may be two to six hours with limitation of the total amount of a salt administered over a 24 hour day to about 100 mg. per kg. if nickel continues to be eliminated in quantities greater than normal. The level at which initial toxic effects have been observed is at a dosage of about 500 mg. per kg., although the $LD_{50}$ is about 1500 mg. per kg. In addition to the systemic reactions which may be observed, the amount of nickel in urine provides a method for judging severity of exposure. While treatment may be started as soon as possible after exposure, if there is doubt as to the severity of exposure, full treatment with a defined dithiocarbamate may be deferred until an analysis for nickel in urine has been made and the extent and duration of treatment may be based on such analyses, particularly over a period of as much as a week or more. The amount and extent of a dithiocarbamate given may be regulated by the continued appearance of nickel in urine at levels in excess of normal excretion.

Larger amounts of nickel are excreted in urine and feces when animals exposed to toxic forms of nickel have been administered one of the herein defined salts than when no such salt has been given. Changes in nickel content become a criterion of nickel removal.

When analysis of urine is less than 10 micrograms per 100 ml., therapy may be withheld. Above 10 micrograms per 100 ml. where poisoning appears sub-acute and without serious symptoms, a water-soluble salt may be administered per os. Doses of one-half to one gram may be given at two to six-hour intervals for the average man. If the concentration of nickel in a sample of urine collected for the period of eight hours after exposure exceeds 50 micrograms per 100 ml., then a defined salt should be administered parenterally in amounts from 25 to 100 mg./kg.

For administration by mouth a defined salt may be used in a capsule, an enteric coated pill, a tablet, or a freshly prepared solution as in a syrup. Compositions may desirably be prepared which contain in sufficient proportion a buffer salt to bring the pH of a solution of the resulting composition, conveniently at 10%, below a value of 10, preferably to a value between 7.5 and 9. For this purpose, there may be used small amounts of sodium (or potassium) acid phosphate, acid citrate, or bicarbonate, or the like. Generally, about 30 to 200 mg. of sodium dihydrogen phosphate hydrate may be used per gram of a defined salt or a comparable amount of other buffering salt. Mixtures of buffer salts may also be used.

A defined dithiocarbamate may be granulated with starch, with starch and a gum, or with starch and lactose. Buffer may be added. The resulting mixture can then be pressed together. The only precaution to be observed in the usual procedures for placing a defined dithiocarbamate in a convenient dosage form is to use temperatures during granulating and drying which are below those at which decomposition may occur.

A typical composition for a tablet mixture consists per tablet of 0.5 gram of a defined dithiocarbamate, 0.062 gram of starch, 0.026 gram of lactose, and 0.012 gram of lubricant, which may be stearic acid or sodium stearate. If desired, this may be supplemented with 0.025 gram of sodium dihydrogen phosphate.

There are some situations in which an ointment is desired for topical applications. This may be prepared by dispersing thoroughly three parts of a defined dithiocarbamate in 57 parts of U. S. P. hydrophilic ointment base.

Efficacy of the defined dithiocarbamates was determined with various animals.

Mice were exposed to 0.06 and 0.09 mg. per liter of nickel carbonyl in air for a half hour. Half of the thus exposed mice were not further treated. Of these 80% died. Of the rest of the mice half were given sodium diethyldithiocarbamate trihydrate intraperitoneally in amounts of 50 mg. per kilogram of body weight, the remaining half was given this salt in amounts of 100 mg. per kilogram. None of the mice died which had been administered the dithiocarbamate.

Mice were given approximately $LD_{50}$ doses of nickel nitrate by injection of an aqueous 5% solution of nickel nitrate intraperitoneally, this being 10 mg. per kg. of body weight. Of the control group 50% died within five days. Half of the injected mice were given 100 mg./kg. of sodium diethyldithiocarbamate in solution by intraperitoneal injection. None of this group died. The same end result is obtained when sodium dimethyldithiocarbamate, sodium dipropyldithiocarbamate, or diethoxydithiocarbamate is administreed to mice poisoned with nickel nitrate.

Rats were exposed to nickel carbonyl at 0.25 mg. per liter of air for 30 minutes. Those not given treatment died; those administered the sodium salts of lower dialkyldithiocarbamate or of diethoxydithiocarbamate survived, the rates of adminstration in various groups being 25, 50, and 100 mg./kg. Other rats were subjected to ten times the lethal dose of nickel carbonyl. Results were identical. All exposed and untreated rats died; those given sodium diethyldithiocarbamate at the rate of 100 mg. per kilogram of body weight survived. The same results were obtained with sodium dimethyldithiocarbamate, diisopropyldithiocarbamate, and diethoxydithiocarbamate. In a similar way magnesium or calcium salts of these various dithiocarbamic acids can be used to alleviate the poisonous effects of the nickel.

Another group of rats is exposed to nickel carbonyl at 0.50 mg. per liter of air for 30 minutes. Half of these are used as controls; these die within five days. The rest are administered by stomach tube doses of sodium salts of the lower dialkyldithiocarbamates in aqueous solution adjusted to a pH of about eight with sodium dihydrogen phosphate and at a rate of 50 mg. per kg. of body weight. All the thus treated rats survive.

Rabbits are likewise exposed to toxic doses of nickel carbonyl. In one series a concentration of 0.25 mg. per liter of air is used and in another 1.5 mg. per liter of nickel carbonyl. In each series rabbits are left untreated with subsequent death. Others are administered by mouth and by injection compositions containing soluble salts of the various defined dithiocarbamic acids at rates of 25 mg. and 50 mg. per kg. All of these rabbits survive for the five day test period.

Since the $LD_{50}$ of the soluble salts of the above mentioned dithiocarbamic acids is about at least 1000 mg. per kg. and usually 1500 mg./kg., it is possible to obtain favorable results by administering one of these soluble salts over a wide and practical range in doses of 5 to 100 or more mg./kg. Our data show that these salts are far more effective than BAL, by a factor of 90 or more.

The salt may be administered all at one time in cases of low exposure. Again, it may be given in two or more doses, particularly when exposure has been moderate or severe and the extent of treatment needed may be estimated by elimination analyses.

In experience with men working with nickel carbonyl, it has been found that when men have been exposed to toxic levels of this compound, characteristic initial symptoms of nickel carbonyl poisoning may appear immediately after exposure and delayed symptoms appear some hours or even days thereafter. Samples of urine taken within eight hours following exposure contain abnormal amounts of nickel.

In a specific case of poisoning the urine of an exposed worker was found to have in two samples 45 and 60 micrograms per 100 ml., a concentration that may be associated with serious consequences. This worker was given by mouth, over a period of 24 hours, a composition containing two grams of sodium diethyldithiocarbamate together with 0.1 gram of sodium dihydrogen phosphate and granulating materials. Within 24 hours the nickel concentration in urine increased to 130 micrograms per 100 ml. and thereafter decreased over the following eight days. On each of these days a dose of 0.5 gram of the above dithiocarbamate was administered together with 0.1 gram of buffer salt.

Within a half hour after administration of an initial dose 0.5 gram of the above dithiocarbamate, the most distressing symptom of sense of constriction over the precordium and labored breathing disappeared. Thereafter, the worker was more comfortable without development of the usual delayed symptoms.

In three other cases of poisoning by nickel carbonyl, there was less exposure than in the above case. Urine samples contained above 25 micrograms per 100 ml. Administration of a tablet containing a composition of granulating agents, 0.05 gram of sodium dihydrogen phosphate, and 0.5 gram of sodium diethyldithiocarbamate alleviated the symptoms of nausea, headache, and weakness. Therapy of these 0.5 gram tablets on alternate days maintained a sense of well being while nickel continued to be eliminated in increased concentrations in the urine. Even after about ten days no delayed symptoms were observed.

This soluble salt of diethyldithiocarbamic acid may be replaced with other soluble metal salt, at times with advantage to decrease alkalinity or with any of the other dithiocarbamates defined above.

There is suggestive evidence that the compositions based on these dithiocarbamates could be used against other heavy metals which are complexed by them.

We claim:

1. A composition for mitigating poisonous effects of nickel which comprises a water-soluble metal salt of a member of the class consisting of dialkyldithiocarbamic acids in which the alkyl groups contain not over three carbon atoms each and diethoxydithiocarbamic acid, a buffer to bring the pH of the mixture to a value between 7.5 and 10, and a therapeutic carrier.

2. A composition for mitigating poisonous effects of nickel which comprises a soluble metal salt of a member of the class consisting of dialkyldithiocarbamic acids in which the alkyl groups contain not over three carbon atoms each and diethoxydithiocarbamic acid and an aqueous sterile parenteral diluent containing a buffering agent which with the said salt gives a pH between 7.5 and 10.

3. A composition for mitigating poisonous effects of nickel which comprises a soluble metal salt of a member of the class consisting of dialkyldithiocarbamic acids in which the alkyl groups contain not over three carbon atoms each and diethoxydithiocarbamic acid, a buffer to bring the pH of the mixture to a value between 7.5 and 10, and a solid pharmaceutical carrier.

4. A composition according to claim 3 in tablet form.

5. A composition according to claim 3 in a dosage form having an enteric coating.

6. A method for alleviating the effects of poisonous nickel compounds in warm blooded animals which comprises administering to a said animal after exposure to said nickel compound a water-soluble metal salt of a member of the class consisting of dialkyldithiocarbamic acids in which the alkyl groups contain not over three carbon atoms each and diethoxydithiocarbamic acid, the dosage being regulated in proportion to the extent of poisoning, being from 5 mg. to 100 mg. per kilogram of body weight, and being buffered to a pH between 7.5 and 10.

7. A method for alleviating the effects of poisonous nickel compounds in warm blooded animals which comprises supplying to a said animal after exposure to said nickel compound in a dosage between 5 mg. and about 100 mg. per kilogram of body weight of a water-soluble metal salt of a member of the class consisting of dialkyldithiocarbamic acids in which the alkyl groups contain not over three carbon atoms each and diethoxydithiocarbamic acid buffered to give a pH value between 7.5 and 9.

8. A method for alleviating the poisonous effects of nickel in warm blooded animals which have been exposed to nickel carbonyl which comprises supplying to a said animal after being thus exposed a water-soluble metal salt of a member of the class consisting of (1) dialkyldithiocarbamic acids in which the alkyl groups contain not over three carbon atoms each and (2) diethoxydithiocarbamic acid in a dosage between 5 mg. and about 100 mg. per kilogram of body weight, said salt being buffered to a pH value between 7.5 and 10.

9. A method according to claim 8 in which the water-soluble salt is a salt of diethyldithiocarbamic acid.

References Cited in the file of this patent
FOREIGN PATENTS 715,976    Great Britain _____ Sept. 22, 1954

OTHER REFERENCES

Cotter: J. A. M. A. 155:10, pp. 906–908, July 3, 1954.
Kurtin et al.: J. Invest. Dermatology, 22:6, June 1954, pp. 441–445.
Wishinsky et al.: J. Lab. and Clin. Med., October 1953, 42:4, p. 554.
Foreman: J. A. P. A. (Sci. Ed.), XLII: 10 pp., 629–632.
Chem. Absts.: 47:12108 (1953), 47:8225a (1953), 46:3639b (1952).
Martell et al.: "Chem. of the Metal Chelate Compounds," Prentice-Hall, N. Y., 1952, pp. 431, 432, and sub. index p. 591, entry "Dithiocarbamate-Ni$^{II}$ chelate" (note, subject index page entry "532" is in error and should be "432").